Figure 1:
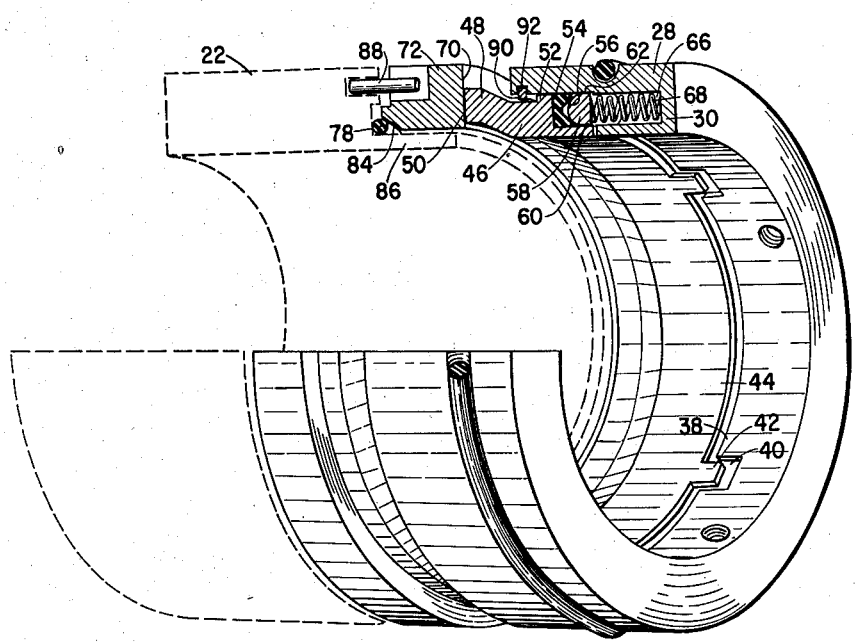

Dec. 13, 1960   O. A. KINZIE ET AL   2,964,340
ROTARY CONDUIT SEAL

Filed Dec. 20, 1957   2 Sheets-Sheet 1

INVENTOR.
ORA A. KINZIE
HUBERT J. WATTS
BY
ATTORNEY

Dec. 13, 1960  O. A. KINZIE ET AL  2,964,340
ROTARY CONDUIT SEAL
Filed Dec. 20, 1957  2 Sheets-Sheet 2

INVENTOR.
ORA A. KINZIE
HUBERT J. WATTS
BY
ATTORNEY

United States Patent Office 2,964,340
Patented Dec. 13, 1960

2,964,340

ROTARY CONDUIT SEAL

Ora A. Kinzie and Hubert J. Watts, Ponca City, Okla., assignors to Continental Oil Company, Ponca City, Okla., a corporation of Delaware Filed Dec. 20, 1957, Ser. No. 704,185

4 Claims. (Cl. 286—11.14)

This invention is directed to improvements in fluid pressure seals and is more particularly concerned with an improved seal for use in accomplishing fluid connection between a rotary conduit and a stationary conduit.

Although a wide variety of seals suitable for use in making a connection between a rotary conduit and a fixed conduit are available, such seals rapidly lose their effectiveness as operating conditions become more severe. Where, for example, a corrosive fluid is introduced, at a pressure of 200 pounds per square inch or more, to the interior of a multiphase centrifugal extractor which is rotating at a velocity of from two to three thousand revolutions per minute or more, conventional seals rapidly tend to completely lose their effectiveness. This is especially true where the rotational velocity of the conduit varies as a result of variations in drive speed and in the loads imposed upon the unit. Under these circumstances the rotary conduit is not only subject to continuous longitudinal displacement or end-play but is also subject to intermittent axial misalignment. Conventional seals are incapable of continuous accommodation for such end-play and axial misalignment with the result that excessive leakage occurs through these seals.

Figure 2:
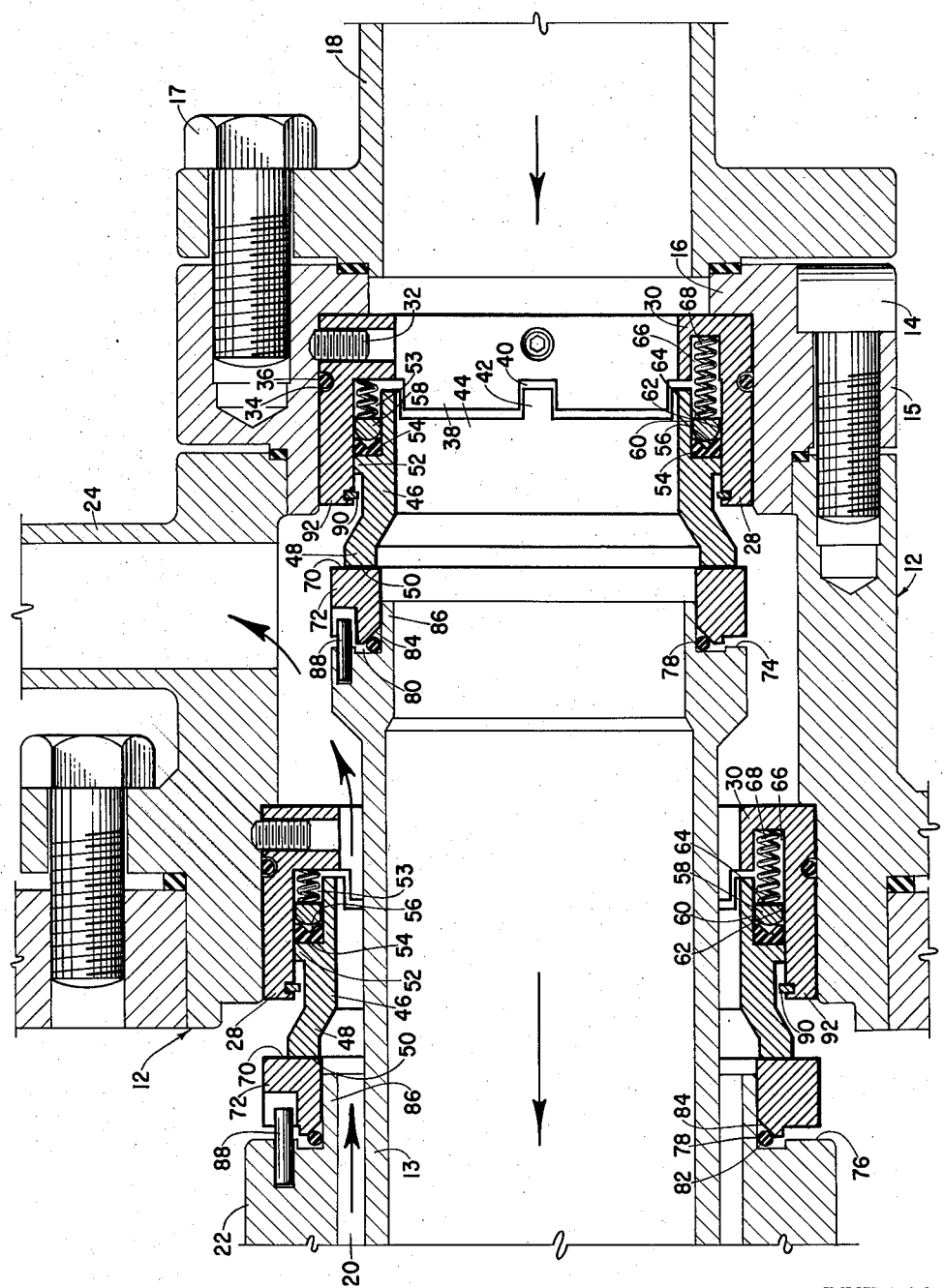

It is therefore a principal object of our invention to provide a seal between a rotary conduit and a fixed conduit which will adjust for axial and longitudinal displacement of the rotary conduit and as a result eliminate leakage through the seal. It is another object of our invention to provide a unitary seal which is readily adapted for use with a rotating conduit without requiring extensive modification of existing structure. These, as well as other objects of our invention, will become apparent from a consideration of the following description as related to the drawing, in which:

Figure 1 is a perspective view of the seal of our invention, with parts broken away for clarity, and Figure 2 is a longitudinal sectional view of our seal in operative connection between each rotary conduit and each stationary conduit of a unit employing two seal assemblies.

The drawings generally illustrate a portion of the stationary housing 12 of a unit such as a multiphase centrifugal extractor within which a rotary conduit 13 is mounted upon bearings (not shown). Secured to the housing 12 by bolts 14 in axial alignment with the rotary conduit is a collar 15 having an internal flange 16 against which the seal of our invention abuts. Secured to the collar 15 by bolts 17 is a stationary conduit 18 which is also in axial alignment with the rotary conduit 13. It will be apparent that collar 15 may be considered to be an extension of the stationary conduit 18 or the collar and conduit may be constructed as a unitary element. Fluid is admitted into the interior of the unit through stationary conduit 18 and rotary conduit 13 and may be withdrawn through an outlet passageway 20 which is provided between the rotary conduit 13 and a concentric rotary conduit 22. This passageway communicates with an outlet conduit 24.

A sleeve 28 having a radially inwardly extending shoulder 30 is seated internally of conduit 18 upon the shoulder 16 of collar 15 and is retained in position by a plurality of set screws 32. The stationary sleeve is provided with a circumferential groove 34 within which is retained a flexible, resilient gasket 36 to insure sealing between the sleeve and its mating surface. Projecting from the inwardly extending shoulder 30 is a rim 38 having a plurality of slots 40 engaged by corresponding lugs 42 which extend axially from the rim 44 of a stationary ring 46. The latter member is substantially cylindrical in form except for an outwardly flaring section 48 terminating in a wear resistant bearing face 50 and except for a circumferential flange 52 extending radially outwardly of the ring 46 and engaging the internal annular surface of the sleeve 28. Rim 44, flange 52 and sleeve 28 form a recess 53 within which a flexible gasket 54 having a V-shaped, grooved face 56 is positioned. Seated on this face is a compression ring 58 having an arcuate section abutting the face 56 of the gasket 54, a pair of cylindrical sides 60 and 62 respectively slidably engaging the external annular surface of rim 44 and the internal annular surface of sleeve 28, and a flat face 64. Bored in shoulder 30 are a plurality of holes 66 which retain a plurality of compression springs 68 between the compression ring 58 and the shoulder 30. Alternatively, a single coil spring, seated within recess 53, could be employed.

These springs urge compression ring 58 and flexible gasket 54 into contact with the flange 52 and hence urge the bearing face 50 of stationary ring 46 into contact with the wear resistant bearing face 70 of rotary ring 72. The latter ring is spaced from the face 74 (or 76 respectively) of rotary conduit 13 (or 22) by a flexible resilient O-ring abutting gasket 78 which may be seated within a U-shaped groove 80 (or 82) in this face. Ring 72 has an internally bevelled rim 84 abutting gasket 78. The sloping face of this rim in conjunction with the flexible, resilient gasket not only insures a fluid tight seal between the rotary conduit and ring 72 but also guarantees sufficient flexibility of movement of ring 72 to encourage its axial alignment with the rotary conduit. As shown, the rotary conduits 13 and 22 are each provided with an internally disposed, axially extending collar 86, upon which rotary ring 72 is mounted. The presence of this collar is not, however, essential to the proper functioning of our seal and may be absent if desired. Frictional engagement between the conduit, the gasket 78 and the ring 72 is ordinarily sufficient to cause rotation of the ring with the conduit. A pin 88 may, nevertheless, be used to affix these members in nonslipping relationship.

The stationary sleeve 28 and ring 46 are maintained in proper assembly prior to installation by a snap ring 90 which is retained in an internal annular groove 92 provided in the sleeve.

When fluid is admitted into the unit through conduit 18, its pressure is exerted upon the face 64 of compression ring 58. The arcuate surface of this ring is thus urged against the grooved face 56 of flexible gasket 54, compressing it against surfaces 60 and 62 and assuring no fluid flow past this gasket.

The force exerted by the fluid is transmitted through ring 46 to the ring 72, although because the area of bearing face 50 is more than the effective area of application of fluid pressure on the face 64 of the compression ring 58, the force per unit area applied to face 70 is less than the internal fluid pressure. The result is a balanced seal with minimum frictional wear upon bearing faces 50 and 70.

The structural elements of our seal may be constructed of any suitable material. The O-rings 36 and 78 and the gasket 54 will, however, be made of flexible, resilient material in order to permit continuous adjustment of the seal for axial misalignment and end-play of the rotary conduit. The material for these elements should also be selected to be compatible with the fluid flowing through the conduit. For example, while rubber would be satisfactory for some liquids, Teflon or some other resistant plastic would be required where the contacting fluid was corrosive.

The wear resistant bearing faces 50 and 70 should, for extended life, be constructed of tungsten carbide, titanium carbide, stellite, a Teflon fluorocarbon plastic or other tough, abrasion resistant material. In any event, we have found that the utilization of a nongalling material is most important to successful operation, since a material which wears fails to present a continuously flat face to its mating face with the result that the seal is unable to adjust for minor, intermittent displacements.

As an example of the improved results obtained with our seal as contrasted with those obtained with a seal utilizing a carbon wear ring and having no specific provision for adjustability, leakage through the latter seal was at the rate of 1–2 g.p.m. at a flow rate of 35 g.p.m., a rotational velocity of from 1800–2200 r.p.m., and an internal pressure of from 150–200 p.s.i., while leakage through our seal under identical conditions could not be measured as a practical matter because of its insignificance.

Having fully described our invention, we claim:

1. A seal in combination with a fixed conduit, an axially aligned rotary conduit and a stationary housing, comprising; a rotary ring having a wear resistant bearing face, a flexible gasket, said rotary ring being adjacent to but spaced from the face of said rotary conduit by said gasket, a nonrotatable ring having a circumferential flange and a wear resistant bearing face in contact with the bearing face of said rotary ring, a sleeve having a radially inwardly extending shoulder secured to said housing slidably engaging said nonrotatable ring, a second flexible gasket seated upon said flange and abutting a circumferential surface of said nonrotatable ring and an internal annular surface of said sleeve, a compression ring seated upon the face of said second gasket, spring means abutting said inwardly extending shoulder and said compression ring and urging said nonrotatable ring face into contact with said rotary ring face, and means for interengaging said nonrotatable ring with said sleeve.

2. The seal of claim 1 in which the surface area of contact of said nonrotatable ring face is greater than the area from which fluid pressure internally of said seal is transmitted to said face.

3. The seal of claim 1 in which said interengaging means comprises an annular rim on said sleeve having a plurality of slots internally of said internally extending shoulder and a corresponding annular rim having a plurality of lugs on said nonrotatable ring, said lugs mating with said slots to prevent rotation of said nonrotatable ring.

4. The seal of claim 1 in which said face of said second gasket is provided with a groove and said compression ring has an arcuate surface abutting said groove and cylindrical sides respectively slidably contacting the internal circumferential surface of said sleeve and the external circumferential surface of said first ring.

References Cited in the file of this patent

UNITED STATES PATENTS

| | | |
|---|---|---|
| 2,250,311 | Meyer | July 22, 1941 |
| 2,311,494 | Vedovell | Feb. 16, 1943 |
| 2,462,006 | Schmitter et al. | Feb. 15, 1949 |
| 2,619,040 | Maisch | Nov. 25, 1952 |
| 2,705,177 | Waring | Mar. 29, 1955 |
| 2,717,166 | Hedden | Sept. 6, 1955 |
| 2,760,794 | Hartranft | Aug. 28, 1958 |
| 2,777,702 | Rodal | Jan. 15, 1957 |
| 2,789,843 | Bily | Apr. 23, 1957 |

FOREIGN PATENTS

| | | |
|---|---|---|
| 759,627 | Great Britain | Oct. 24, 1956 |